United States Patent [19]
Kuzan et al.

[11] Patent Number: 6,142,166
[45] Date of Patent: Nov. 7, 2000

[54] METHOD AND TOOL FOR PLUGGING A SERVICE CONNECTION IN A GAS MAIN

[75] Inventors: Pawel Kuzan; Jacek Wiercienski, both of Oakville, Canada

[73] Assignee: The Consumer's Gas Company Ltd., North York, Canada

[21] Appl. No.: 09/282,439

[22] Filed: Mar. 31, 1999

[30] Foreign Application Priority Data

Nov. 9, 1998 [CA] Canada ................................. 2253120

[51] Int. Cl.[7] .............................. F16K 43/00; F16L 41/04; B23B 39/10; B23B 41/08
[52] U.S. Cl. ................................. 137/15.14; 137/315.41; 137/318; 408/72 R; 408/84; 29/221.6
[58] Field of Search ......................... 137/15.13, 15.14, 137/315.41, 318; 408/72 R, 84, 87, 92, 95; 29/213.1, 221.6

[56] References Cited

U.S. PATENT DOCUMENTS

| | | | |
|---|---|---|---|
| 111,474 | 1/1871 | Kiley ....................................... | 137/318 |
| 153,606 | 7/1874 | Plimley ................................... | 137/318 |
| 210,706 | 12/1878 | Penney .................................... | 137/318 |
| 284,746 | 9/1883 | Lennox .................................... | 408/92 |
| 309,085 | 12/1884 | Payne ...................................... | 408/92 |
| 358,445 | 3/1887 | Hall ........................................ | 408/92 |
| 478,771 | 7/1892 | Payne ...................................... | 408/92 |
| 549,619 | 11/1895 | Walker .................................... | 137/318 |
| 561,620 | 6/1896 | Sharp ...................................... | 137/318 |
| 585,124 | 6/1897 | Shelley .................................... | 408/92 |
| 864,072 | 8/1907 | Boyd ....................................... | 137/318 |
| 1,590,186 | 6/1926 | Fanselow ................................. | 137/318 |
| 1,783,503 | 12/1930 | Hall ........................................ | 137/318 |
| 1,956,129 | 4/1934 | Mueller et al. .......................... | 137/318 |
| 2,115,992 | 3/1938 | Koppl ..................................... | 137/318 |
| 2,151,594 | 3/1939 | Grantham ................................ | 137/318 |
| 2,601,434 | 6/1952 | Dubois .................................... | 137/318 |
| 2,647,419 | 8/1953 | Dickason ................................. | 137/318 |

*Primary Examiner*—George L. Walton
*Attorney, Agent, or Firm*—Dimock Stratton Clariz; Mark B. Eisen

[57] ABSTRACT

A tool and method for plugging a service connection to a gas main in preparation for removal of the service tee removes the perforator, mills the hole in the main to provide a smooth seat for a sealing plug, and inserts a gas-tight sealing plug into the hole. The tool of the invention is operable through a narrow "keyhole" excavation, which decreases the risk to service personnel and significantly reduces costs of repairing the excavation. In the preferred embodiment the tool is loaded with a milling bit and a sealing plug before attachment to the service tee. The tool head is engaged to the service tee in a gas-tight fit to prevent the escape of gas during the procedure, and an adapter plate is pivoted between three working positions to perform the three steps of the service connection plugging method. In the preferred embodiment a pneumatic gear motor drives a hexagonal driver bit actuated by a linear actuator located in the shaft of the tool, the driving bit providing the required mechanical interface with each of the accessories involved in each step of the procedure. A separate pneumatic motor pivots the adapter plate between working positions, and specialized adapter is provided at each working position of the adapter plate allowing the same actuators to be used for the perforator removal, milling and plugging operations.

4 Claims, 9 Drawing Sheets

METHOD AND TOOL FOR PLUGGING A SERVICE CONNECTION IN A GAS MAIN

FIELD OF INVENTION

This invention relates to pipe tools. In particular, this invention relates to a method and tool for plugging a service connection in a gas main in preparation for removing a service tee connection from the main.

BACKGROUND OF THE INVENTION

Natural gas is distributed to residential, commercial and industrial users through underground gas mains. When natural gas service is required at a previously unserviced premises, a service line is connected to the gas main to divert a flow of gas to the premises.

Self tapping service tees provide a fast and economical means of connecting the service line to a steel gas main. A self tapping service tee comprises a hollow steel body for connection to the main, having a threaded interior wall engaging a perforator and a service outlet projecting from the body for connection to the service line.

One end of the service tee is welded to the main and the service line is connected to the service outlet. The perforator, which has a solid body provided with a threaded exterior surface complimentary to the interior threading of the tee body and a cutting tip for piercing the main, is threaded into the body through an opening at the free end. The perforator is rotated within the body by a ratchet wrench, and recedes into the body until the cutting tip pierces the wall of the main and removes a small disc-shaped section of the main wall, known as a "coupon". At this point the perforator blocks the flow of gas out of the main. The perforator is then rotated in the other direction and retracted to the free end of the service tee body to admit gas into the tee body and through the service outlet. The perforator thus serves as a temporary plug to prevent gas from escaping during the connection procedure, and also retains the pipe coupon. Sealing compound is applied to exterior threading about the free end of the body and to the threading of a cap, which is screwed onto the free end of the tee body to complete the connection.

One of the most common operations performed by natural gas utilities is the removal of service tees from a gas main, known as a "pin-off" procedure.

According to the conventional procedure for removing a service tee, the steel cap is removed from the free end of the tee and the perforator is removed from the tee body. With gas escaping at high pressure from the free end of the tee, a steel rod is measured and marked to ensure sufficient penetration into the main. The rod is inserted into the free end of the service tee body, forced through the body against the pressure of the escaping gas and hammered into the opening in the main until a complete seal is obtained. The rod is measured again to ensure proper penetration into the main. The gas is blown down at the service line, and the service tee is cut with a hacksaw between the service outlet and the main. The detached portion of the service tee is lifted up and over the rod and discarded. The rod is welded to the main and soap tested for leaks. Once the seal is established to be gas-tight the rod is cut as close to the main as possible, and a coating of mastic is applied to the repair before backfilling the excavation.

This procedure presents potential hazards due to the danger inherent in having gas escaping from the service tee at high pressure during much of the procedure. Moreover, an element of human error is introduced by reliance upon measurements of the rod to ensure proper penetration into the main.

In another procedure the steel cap is removed to expose the opening in the free end of the body. The perforator is rotated back into the body until its frustoconical seat plugs the opening in the main, and the gas is blown down at the service line. In this position the perforator is well beyond the service outlet. The tee body is cut between the service outlet and the main, usually through the solid body of the perforator, and the detached portion of the service tee is discarded. The remaining piece of the perforator is welded to the remains of the service tee body (the "pin-off"), the weld is cleaned with a grinder, and a steel cap is welded on top of the pin-off to prevent mechanical damage. The welds are soap tested for leaks before the excavation is backfilled.

In this procedure the perforator becomes a permanent plug, the reliability of which can be suspect if the perforator seat does not precisely seal the opening in the main. During installation the cutting tip of the perforator cuts straight through the main wall, so the frustoconical perforator seat contacts the main only about the exterior edge of the opening, and the slow cutting action of the perforator does not usually leave a smooth edge around the hole. Thus, the welding step becomes particularly important to ensuring that a gas-tight seal is maintained.

In either of these pin-off procedures, in order to perform the procedure a sufficiently large area around the service connection must be excavated to enable a technician to work on the main from within the excavation. Although excavation is generally not itself a costly process, the repair of such an excavation, particularly where the service connection is beneath a road or sidewalk, can be extremely costly.

Further, there are always safety concerns associated with having service personnel working inside an excavation next to a live gas main.

SUMMARY OF THE INVENTION

The present invention overcomes these disadvantages by providing a tool and method for plugging the service connection to the main in preparation for removal of the service tee. The invention prepares the service tee for removal by removing the perforator, milling the hole in the main to provide a smooth seat for a plug, and inserting a gas-tight sealing plug into the hole so that once the service tee is cut, no welding step is required to augment the gas-tight seal. The tool of the invention is operable through a narrow excavation, or "keyhole", which may be no more that 18" or so in diameter. The invention accordingly provides a tool and method for plugging the service connection which allows the entire pin-off procedure to be undertaken from above ground level, decreasing risks to service personnel; through a narrow "keyhole" excavation the repair of which costs a small fraction of the repair cost of an excavation required for a conventional pin-off procedure; and in a sealed environment on a live gas main which prevents the escape of gas from the main during the pin-off procedure.

In the preferred embodiment the tool is loaded with the milling bit and a sealing plug before attachment to the service tee. The tool head is engaged to the service tee in a gas-tight fit to prevent the escape of gas during the procedure, and contains an adapter plate pivotable between three positions to respectively perform each of the three steps of the service connection plugging method. The tool head remains attached to the free end of the tee body throughout the method of the invention, avoiding any possibility of gas escaping.

In the preferred embodiment a pneumatic gear motor drives a hexagonal driver bit actuated by a linear actuator located in the shaft of the tool, the driving bit providing the required mechanical interface with the accessories involved in each step of the procedure. A separate pneumatic motor pivots the adapter plate between positions, and specialized adapter is provided at each working position of the adapter plate allowing the same actuators to be used for the perforator removal, milling and plugging operations.

The invention is thus particularly well adapted for plugging a service tee in a gas main, however it will be apparent from the description which follows that the tool and method of the invention may also be used to plug a connection branching from a pipe in other environments.

The present invention thus provides a tool for plugging a service connection in a gas main comprising a service tee having a connector body affixed to and in fluid communication with the pipe through a hole in a wall of the pipe, the connector body having an interior threaded surface and a threaded body with an engagable socket engaged in the connector body, comprising a head having a working face with an opening for engagement to the free end of the connector body, a retractable driver bit having a tip adapted to engage the socket in the threaded body, in generally concentric alignment with the opening, a first actuator for extending the driver bit through the opening in the working face, a second actuator for rotating the driver bit, an adapter plate mounted within the head and pivotable between first, second and third working positions, the adapter plate having a first opening in generally concentric alignment with the opening in the working face when the adapter plate is in the first working position, a second opening in generally concentric alignment with the opening in the working face when the adapter plate is in the second working position, and a third opening in generally concentric alignment with the opening in the working face when the adapter plate is in the third working position, a holder for engaging the threaded body, mounted on the adapter plate in the first working position, a milling bit for milling a seat in the wall of the pipe, mounted on the adapter plate in the second working position, and a sealing plug for threadedly engaging the connector body mounted on the adapter plate in the third working position, wherein the driver bit engages the threaded body to extract the threaded body from the connector body in the first working position; the driver bit engages the milling bit to drive the milling bit into the connector body to mill a seat in the wall of the pipe in the second working position; and the driver bit engages the sealing plug to drive the sealing plug into the connector body and plug the hole in the third working position.

The present invention further provides a tool for plugging a connection in a pipe wherein the connection comprises a connecting member having a connector body affixed to and in fluid communication with the pipe through a hole in a wall of the pipe, the connector body having an interior threaded surface and a threaded body with an engagable socket engaged in the connector body, comprising a head having a working face with an opening for engagement to the free end of the connector body, a retractable driver bit having a tip adapted to engage the socket in the threaded body, in generally concentric alignment with the opening, a first actuator for extending the driver bit through the opening in the working face, a second actuator for rotating the driver bit, an adapter plate mounted within the head and pivotable between first, second and third working positions, the adapter plate having a first opening in generally concentric alignment with the opening in the working face when the adapter plate is in the first working position, a second opening in generally concentric alignment with the opening in the working face when the adapter plate is in the second working position, and a third opening in generally concentric alignment with the opening in the working face when the adapter plate is in the third working position, a holder for engaging the threaded body, mounted on the adapter plate in the first working position, a milling bit for milling a seat in the wall of the pipe, mounted on the adapter plate in the second working position, and a sealing plug for threadedly engaging the connector body mounted on the adapter plate in the third working position, wherein the driver bit engages the threaded body to extract the threaded body from the connector body in the first working position; the driver bit engages the milling bit to drive the milling bit into the connector body to mill a seat in the wall of the pipe in the second working position; and the driver bit engages the sealing plug to drive the sealing plug into the connector body and plug the hole in the third working position.

The present invention further provides a method of plugging a connection in a pipe wherein the connection comprises a connecting member having a connector body affixed to and in fluid communication with the pipe through a hole in a wall of the pipe, the connector body having an interior threaded surface and a threaded body with an engagable socket engaged in a free end of the connector body, comprising the steps of: a) providing a tool with a head having a working face comprising an opening for engagement to the free end of the connecting body, a retractable driver bit having a tip adapted to engage the socket in the threaded body in generally concentric alignment with the opening, a first actuator for extending the driver bit through the opening in the head and a second actuator for rotating the driver bit; b) aligning a holder for engaging the threaded body with the opening in the working face, extending the driver bit into the socket and rotating the driver bit to remove the threaded body from the connector body; c) aligning a milling bit with the opening in the working face, extending the driver bit into a socket of the milling bit and rotating and extending the driver bit to mill a seat in the wall of the pipe; and d) aligning a sealing plug with the opening in the working face, extending the driver bit into a socket in the sealing plug and rotating the driver bit to drive the sealing plug into the connector body to plug the hole.

BRIEF DESCRIPTION OF THE DRAWINGS

In drawings which illustrate by way of example only a preferred embodiment of the invention.

DETAILED DESCRIPTION OF THE INVENTION

Figure 1:
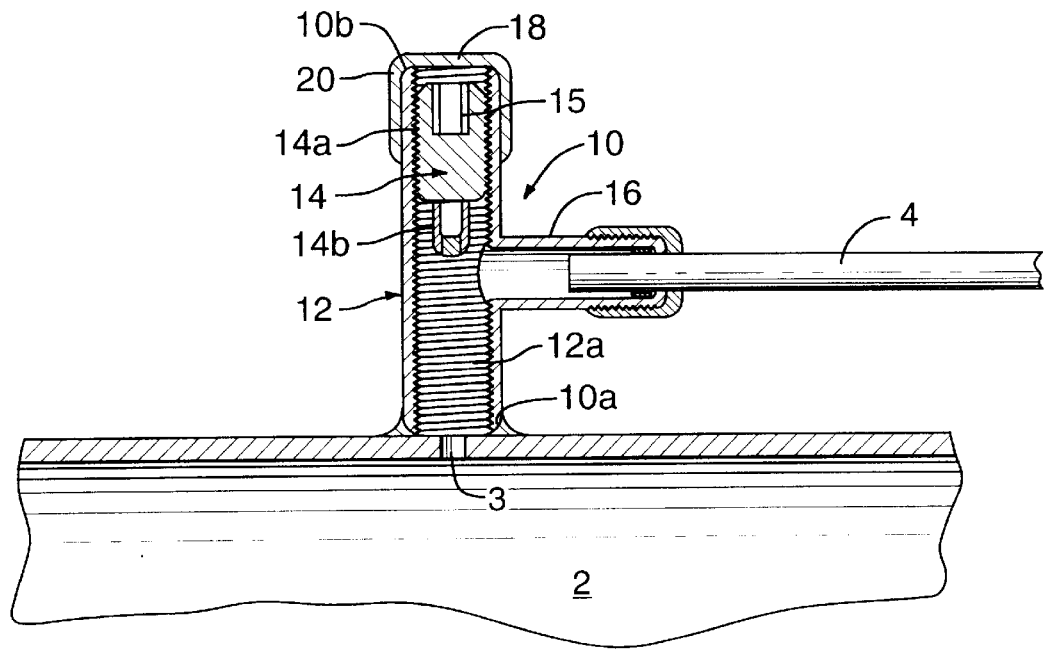
FIG. 1 is a cross-sectional elevation of a service tee welded to a gas main.

FIG. 1 illustrates a service tee 10 typical of the type of service tee on which the invention is designed to operate. The service tee 10 comprises a hollow steel body 12 for connection to a steel gas main 2, having a threaded interior wall 12a engaging a solid perforator 14 and a service outlet 16 projecting from the body 12 for connection to the service line 4, which may be a plastic or steel pipe. An example of such a service tee is the AUTOPERF (Trademark) service tee manufactured by Mueller Co. in the United States.

The service tee 10 is installed by welding a fixed end 10a of the service tee 10 to the main 2 so that the body 12 is generally perpendicular to the main 2, and connecting the service line 4 to the service outlet 16. The perforator 14 has a threaded exterior surface 14a complimentary to the threaded interior wall 12a of the body 12, and a cutting tip 14b for piercing the main 2. The perforator 14 is threaded into the body 12 through an opening 18 at the free end 10b of the service tee 10, and rotated clockwise within the body 12 by a ratchet wrench having a hexagonal bit (not shown) engaging a hexagonal socket 15 in the top of the perforator 14. The perforator thus recedes into the body 12 until the cutting tip 14b pierces the wall of the main 2, removing a small disc-shaped section of the main wall (the "coupon") and leaving a hole 3. The perforator 14 is then rotated in the other direction and retracted to the free end 10b of the body 12, as shown in FIG. 1, to admit gas through the body 12 and into the service outlet 16, at the same time partially plugging the free end 10b to resist the escape of gas during the connection procedure. A steel cap 20 is screwed over the free end 10b of the tee body 12 to permanently seal the service tee 10.

Figure 2:
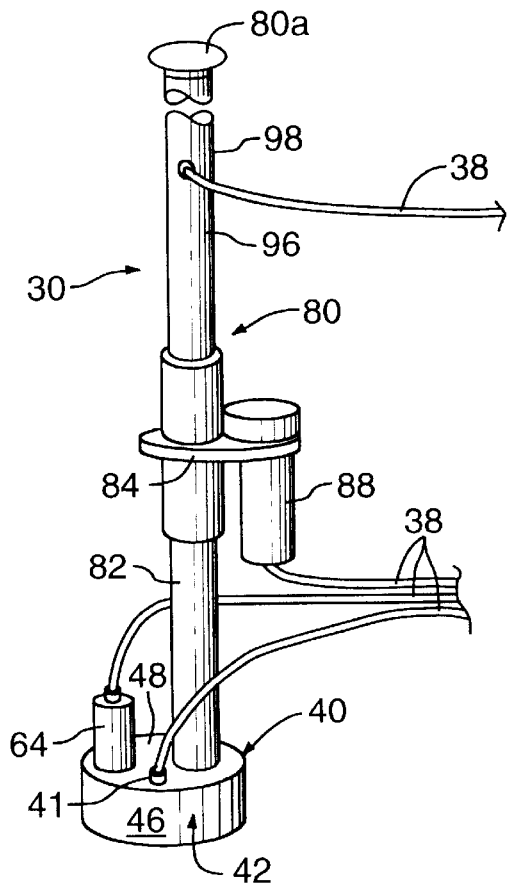
FIG. 2 is a perspective view of the tool for plugging the service connection in preparation for removing the service tee.
Figure 3:
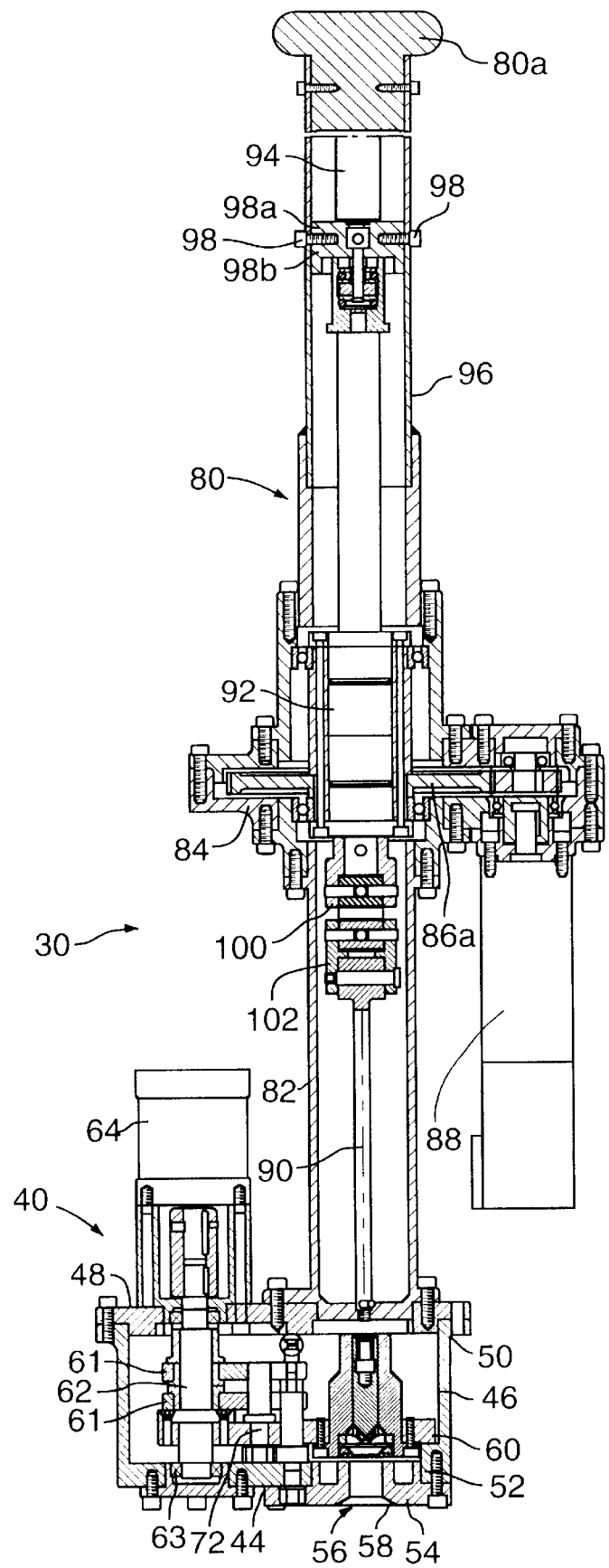
FIG. 3 is a cross-sectional elevation of the tool of FIG. 2.
Figure 4:
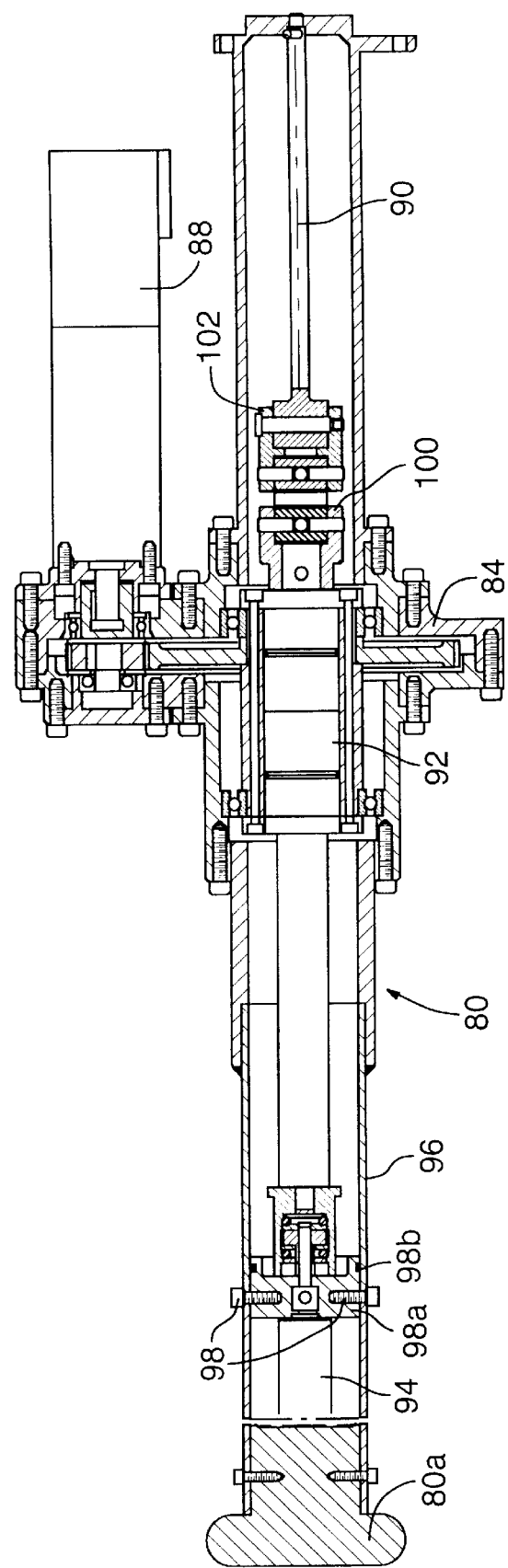
FIG. 4 is a cross-sectional elevation of the shaft of the tool of FIG. 2.
Figure 5:
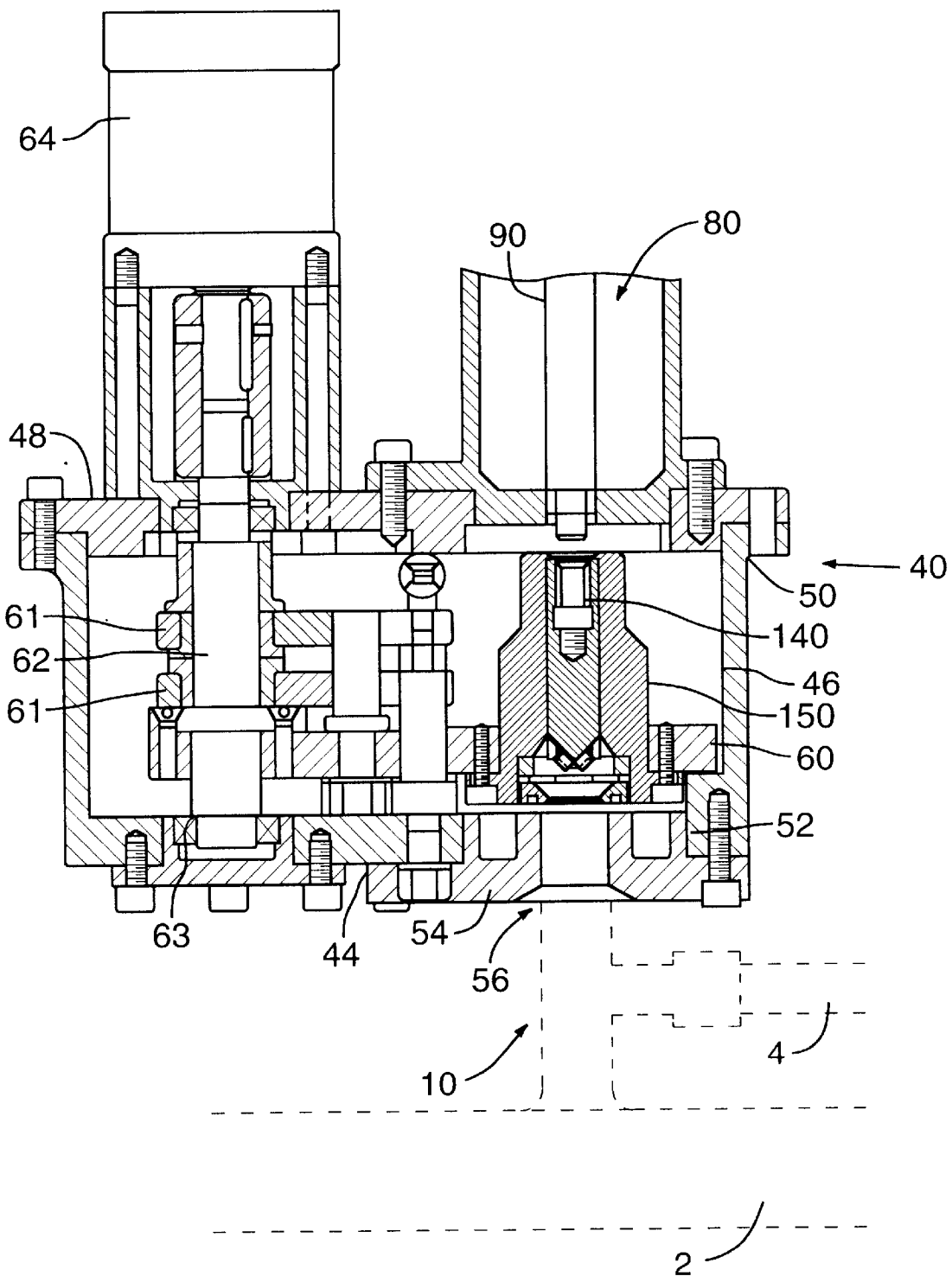
FIG. 5 is a cross-sectional elevation of the head of the tool of FIG. 2.
Figure 6:
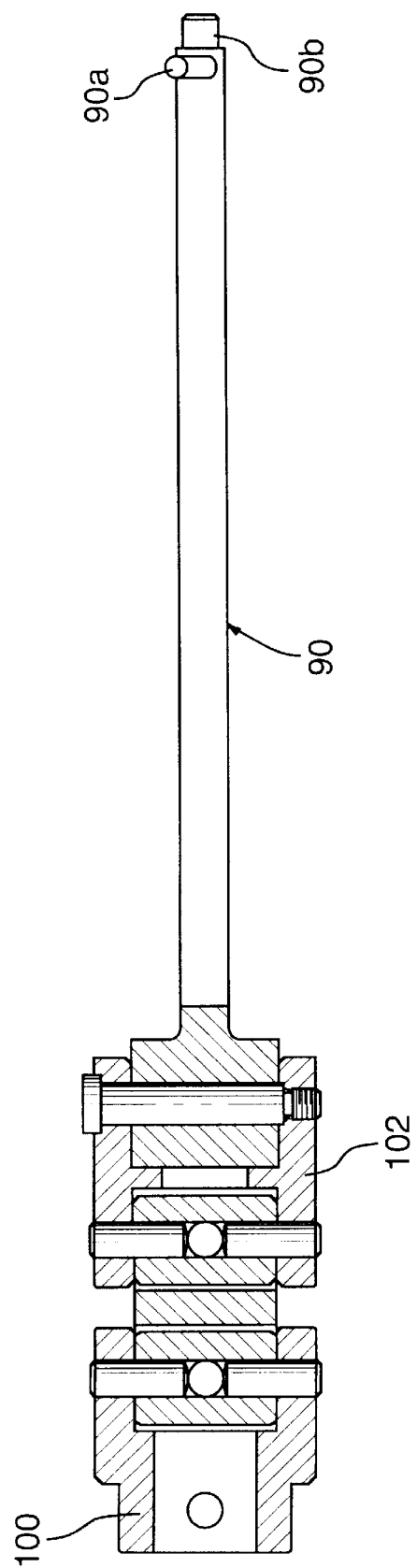
FIG. 6 is a cross-section of the driver bit.

FIGS. 2 and 3 illustrate a tool 30 according to the invention. The tool 30 comprises a head 40 affixed to a tubular shaft 80 which in the preferred embodiment also serves as a handle for the tool 30. The head 40 is inserted into the excavation and engaged about the free end 10b of the service tee 10 to plug the service connection as described in detail below, and thus prepare the service tee 10 for removal by a suitable cutting tool.

The head 40 comprises a housing 42 having a working face 44 preferably formed integrally with a side wall 46 and bolted to a housing plate 48 with an O-ring 50 therebetween to create a gas-tight chamber within the head 40. The working face 44 is provided with an opening 52 in generally concentric alignment with the shaft 80, having a tee adapter 54 with a threaded opening 56 complimentary to the threading 10c about the open end 10b of the service tee 10, for engaging the head 40 to the free end 10b of the service tee 10. The tee adapter 54 preferably has a frustoconical entrance 58 surrounding the opening 56, which serves as a locator to guide the free end 10b of the service tee 10 into the opening 46 as the tool 30 is lowered to be engaged to the service tee 10.

In the preferred embodiment the tee adapter 54 is bolted to the housing 42 and can be removed and replaced with a tee adapter 54 having a different pitch or size of threading, or a different sized opening 56, to accommodate service tees 10 of varying dimensions. It will be appreciated that the tool 30 could be adapted for a specific type or size of service tee 10, in which case the tee adapter 44 could be welded or otherwise permanently affixed to, or formed integrally with, the housing 32.

Figure 7:
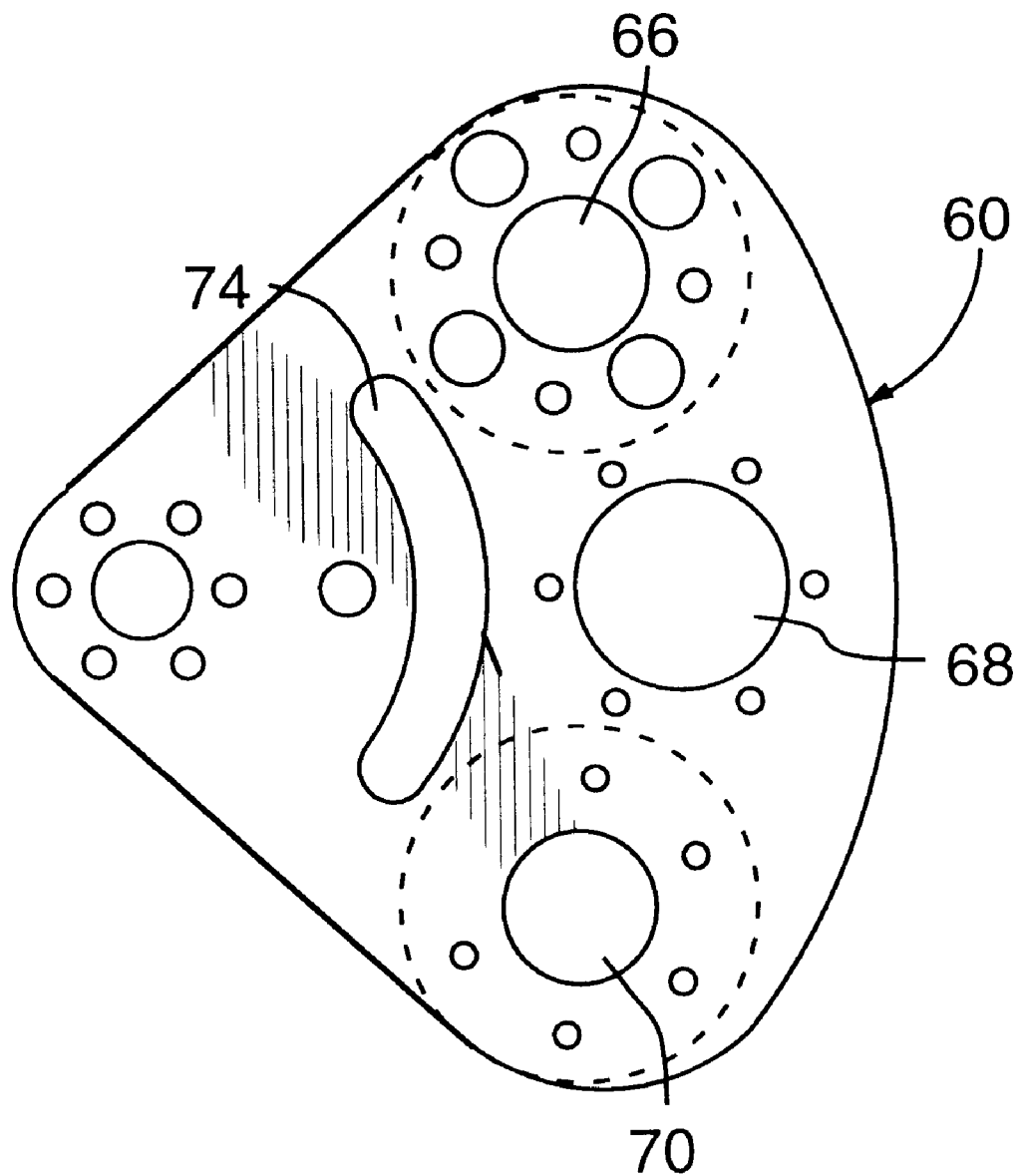
FIG. 7 is a plan view of the adapter plate.

Contained within the head 40 is an adapter plate 60, shown in FIG. 7, which is mounted on the shaft 62 of a pneumatic motor 64 bolted to the housing plate 48. The free end of the shaft 62 is rotatably lodged in a bearing 63 for stability. The adapter plate 60 is thus pivotable within the housing 42 upon actuation of the motor 64, so that in each working position of the adapter plate 60 one of three openings 66, 68, 70 comes into alignment with the opening 56 in the tee adapter 54 (and thus into alignment with the shaft 80 of the tool 30), depending upon the position set by the operator.

Preferably a guide pin 72 extends through a slot 74 in the adapter plate 60 to restrict the range of motion of the adapter plate 60, providing a stopping point at each of the outer working positions. It is advantageous bias the adapter plate 60 to the central position so that it will automatically return to this position when the motor 64 is disengaged, since the motor 64 itself does not have any means for locking into the three working positions of the adaptor plate. The motor 64 thus has three possible positions: the clockwise and counterclockwise limits, as determined by the ends of the slot 74, and the center position when the motor 64 is inactivate. In the embodiment shown the adaptor plate 60 is biased to the center position by a pair of spring biased plates 61, but this can be accomplished by any conventional means. The adapter plate 60 is thus moved to the appropriate working position to perform each step in the method of plugging the service connection: 1) removing the perforator 14; 2) milling a seat for the sealing plug 180; and 3) inserting the sealing plug 180. To each opening 66, 68, 70 is respectively affixed an adapter 110, 150 or 170, described in detail below, configured to perform each respective step of the method. As in the case of the tee adapter 54, the adapters 110, 150 and 170 may be detachable to accommodate service tees 10 of different types or sizes, or may be permanently affixed to or formed integrally with the adapter plate 60 in the case of a tool 30 designed for a specific type or size of service tee 10.

The shaft 80 comprises a section 82 housing the hexagonal driver bit 90, bolted to the housing plate 48 and to a gear box 84 containing a high torque gear train 86 driven by a pneumatic gear motor 88. The gear train 86 rotates the driver bit 90 through a conventional ball spline 92 fixed rotationally to a spur gear 86a, and movable axially within the shaft 80 by a linear pneumatic thrust actuator 94 which may be a conventional pneumatic cylinder. The actuator 94 is anchored to a second section 96 of the shaft 80 by bolts 98 threaded into an anchoring member 98a, which preferably provides a gasket 98b to seal the shaft 80 and confine the gas pressure to the region of the shaft 80 beneath the actuator 94. The open end of the shaft 80 may be capped by a capping member 80a, which is preferably removable so that an extension tube (not shown) may be inserted into the open end of the shaft 80 for deep excavations.

The driver bit 90 can be rotated in either direction at high torque levels by the motor 88 through hear train 86, and can be driven through the opening 56 in the tee adapter 54 into the service tee body 12 and retracted back into the shaft 80 by the actuator 94. The driver bit 90 is used to drive accessories for all three steps of the method of the invention, the hexagonal tip 90b being sized to fit the hexagonal socket 14c in the perforator 14. A spring-biased ball 90a disposed at the working end of the driver bit 90 detachably retains the engagement between the driver bit 90 and each accessory.

The driver bit 90 is preferably fixed to the ball spline 92 by a pair of universal joints 100, 102, as illustrated in FIG.

6. This provides the driver bit 90 with lateral and angular freedom of motion, to compensate for any potential misalignment of the driver bit 90 with the perforator 14 or other accessories.

Figure 8:
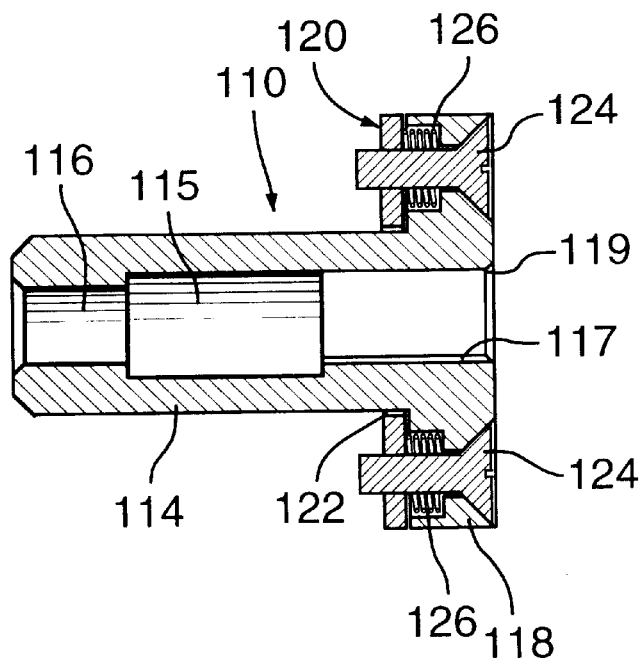
FIG. 8 is a cross-section of the perforator adapter.
Figure 9:
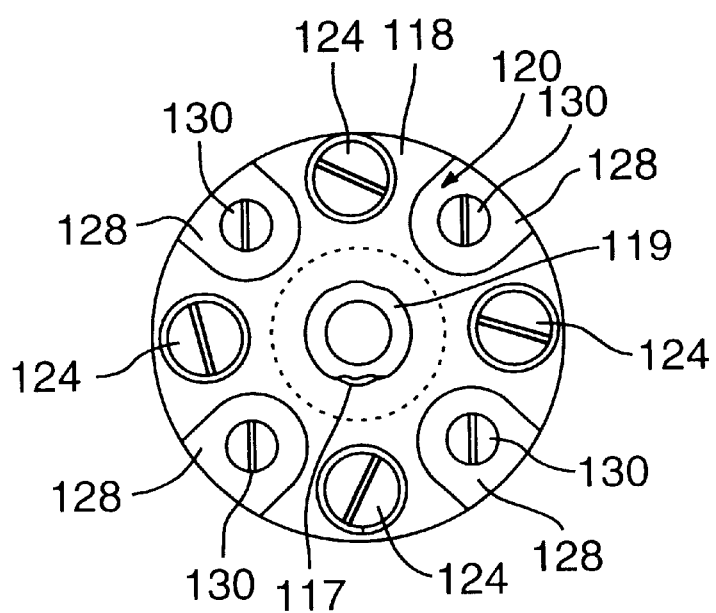
FIG. 9 is a plan view of the perforator adapter.

The perforator adapter 110 is illustrated in FIGS. 8 and 9. The perforator adapter 110 comprises a hollow shaft 114, shown in FIG. 8, having a central bore 116 through which the driver bit 90 can extend to engage the perforator 14, and a securing flange 118. The bore 116 is dimensioned so as to receive the exterior threaded surface 14a of the perforator. The bore 116 has a threaded interior portion 117 for engaging the threaded exterior surface 14a of the perforator 14. In the preferred embodiment most of the circumference of the bore 116 is smooth-walled, the threaded portion 117 being limited to a narrow column of threads, as shown at the bottom of the opening in FIGS. 8 and 9. This ensures that the perforator 14 will thread into the bore 116 even if the bore 116 does not engage the perforator 14 in perfect alignment (if the entire circumference of the bore 116 were threaded, a slight misalignment might cause the perforator 14 to seize in the bore 116 before being fully threaded into the shaft 114). In the preferred embodiment the entrance to the bore 116 is chamfered, as at 119, to guide the perforator 14 into the bore 116.

The perforator adapter 110 is mounted to a spacer 120 having a central opening 122 in alignment with the shaft 114. The adapter 110 is preferably mounted to the spacer 120 in loose fitting engagement, as by shoulder screws 124 slidably engaged through the securing flange 118 and into the spacer 120. Springs 126 urge the adapter 110 to the outer limit of the screws 124, and the conical shape of the heads of screws 124 keep the adapter 110 generally centered relative to the spacer 120 while allowing the adapter 110 some freedom of motion radially relative to the spacer 120. The spacer 120 is bolted directly to the adapter plate 60. This arrangement helps to avoid misalignment, in that the perforator adapter 110 can shift off-centre to compensate for any misalignment between the perforator adapter 110 and the perforator 14. The flange 118 is thus provided with recesses 128 larger than the bolts 130 which affix the spacer 120 to the adapter plate 60, so that the bolts 130 do not interfere with the shifting motion of the perforator adapter 110. In the embodiment shown the perforator adapter 110 is secured to the outer opening 66 in the adapter plate 60, and provision is made about the opening 66 to accommodate the ends of the screws 124.

Figure 10:
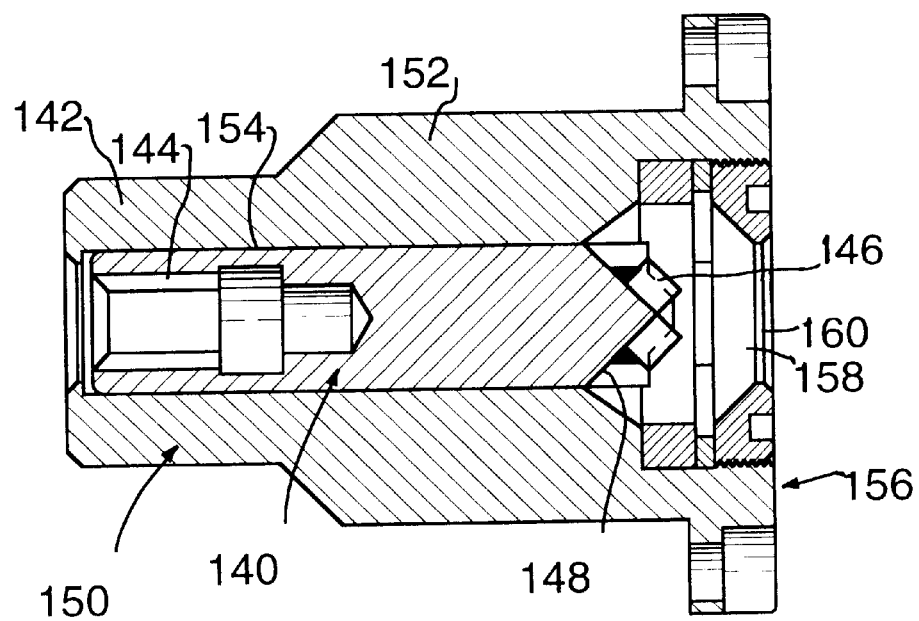
FIG. 10 is a cross-section of the milling tool and milling tool adapter.
Figure 11:
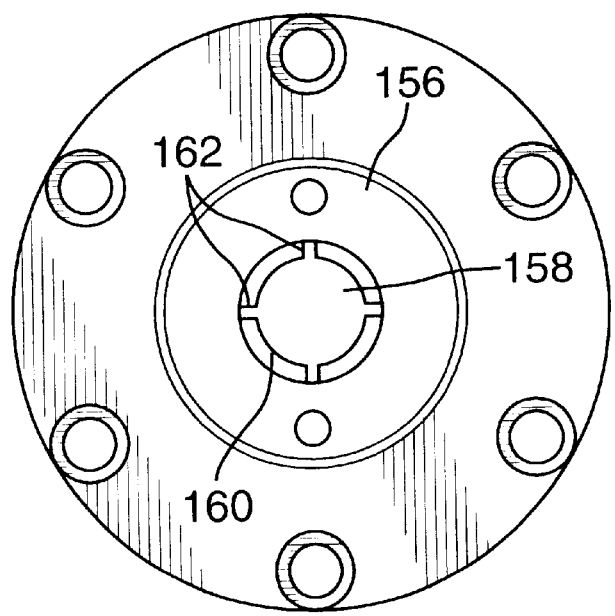
FIG. 11 is a bottom plan view of the milling tool adapter.

The milling bit 140 and milling bit adapter 150 are illustrated in FIGS. 10 and 11. The milling bit 140 comprises a shaft 142 having a hexagonal socket 144 sized for the tip 90b of the driver bit 90 (ie. the same size as the socket 15 in the perforator 14), and a carbide or other suitable cutting tip 146 configured to mill a smooth frustoconical seat in the wall of the main 2. The milling bit 140 has a stop surface 148 that determines the depth of the seat cut into the wall of the main 2, as described below.

The milling bit 140 is removably housed in the milling bit adapter 150. The adapter 150 comprises a body 152 with a bore 154 sized to receive the milling bit 140 in slip-fit relation, and a mouth 156 having an opening 158 through which the milling bit 140 is inserted into and extracted from the bore 154. The mouth 158 is provided with means for removably retaining the milling bit 140 in the bore 154, in the preferred embodiment comprising a resilient washer or membrane 160 with slots 162, which forms a partial shroud over the opening 158 to prevent the milling bit 140 from falling out of the bore 154. The resilient membrane 160 is thus sufficiently rigid to retain the milling bit 140 under its own weight but sufficiently flexible to allow the milling bit 140 to traverse the opening 158 upon the application of pressure, for example manual pressure when the milling bit 140 is loaded into the milling bit adapter 150 or the pressure of the actuator 94 forcing the milling bit 140 out of the adapter 150 during the milling step of the process. In the embodiment shown the milling bit adapter 150 is secured to the central opening 68 in the adapter plate 60.

Figure 12:
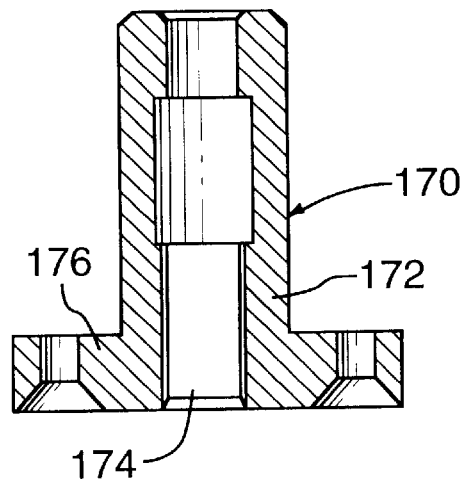
FIG. 12 is a cross-section of the sealing plug adapter.
Figure 13:
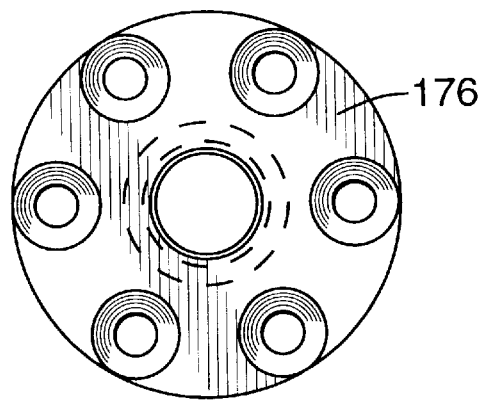
FIG. 13 is a bottom plan view of the sealing plug adapter.
Figure 14:
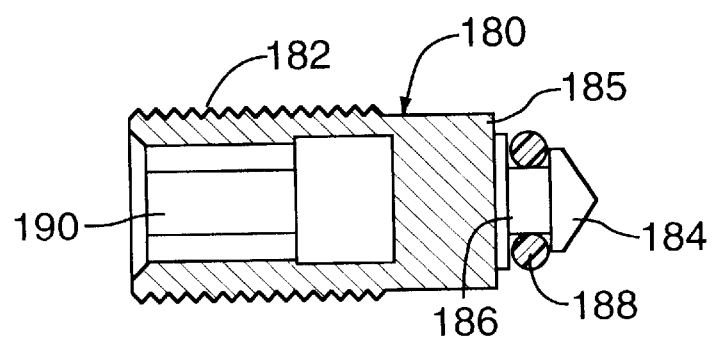
FIG. 14 is a cross-section of the sealing plug.

The sealing plug adapter 170 and sealing plug 180 are illustrated in FIGS. 12 to 14. The sealing plug adapter 170 comprises a body 172 projecting from a flange 176 for securing the adapter 170 to the adapter plate 60. The body 172 has a threaded central bore 174 that engages the sealing plug 180, which has a threaded exterior body 182 complimentary to the threaded interior 12a of the tee body 12. The sealing plug 180, shown in FIG. 14, is provided with a tip 184 which may be conical to facilitate insertion of the plug 180 into the hole 3. The tip 184 is provided with a groove 186 for retaining a sealing gasket 188 such as an O-ring, which will seal against the frustoconical seat milled by the milling bit 140 in the wall of the main 2. The plug 180 is provided with a hexagonal socket 190 sized to fit the hexagonal tip 90b of the driver bit 90. In the embodiment shown the sealing plug adapter 170 is secured to the outer opening 70 in the adapter plate 60.

To prepare for use of the tool 30 of the invention, the ground above the service tee 10 to be removed is excavated by conventional means. For a "keyhole" excavation this typically involves cutting through any surface structure such as a road or sidewalk using a shell cutter or the like, and removing the "cookie". A vacuum apparatus is used to suck away the earth over the main 2. The steel cap 20 is removed from the service tee 10 using a suitable gripping tool (not shown), which may be a pipe wrench or a hydraulically actuated gripper mechanism on a handle, which grips the cap 20 and unscrews it from the body 12 of the service tee 10. The particular means and manner of excavating the site and removing the steel cap 20 from the service tee 10 is a matter of selection out of a number of conventional alternatives and does not form part of the present invention.

To prepare the tool 30 for use, if necessary the tee adaptor 54 is detached, adapters 110, 150 and 170 appropriate for the size of the service tee 10 being removed are bolted to the adapter plate 60 through the opening 52 in the working face 44 of the housing 42, and a tee adaptor 54 of the appropriate size is affixed over the opening 52. With the housing 42 assembled and sealed, the operator manually pivots the adapter plate 60 (using a tool or by hand through the opening 52) into the third working position, so that the opening 70 comes into alignment with the opening 52, and loads a sealing plug 180 into the sealing plug adapter 170 by manually screwing the sealing plug 180 into the bore 174. The operator releases the adapter plate 60 and the adapter plate returns to the second working position, with the central opening 68 in alignment with the opening 52 in the working face 44 of the housing 42. The operator loads the milling bit 140 into the milling bit adapter 150 by pushing the milling bit 140 through the membrane 160 until the milling bit 140 is fully inserted into the bore 158. The membrane 160 retains the milling bit 140 in the bore until the milling step of the pin-off procedure. The tool 30 is now ready for use.

In the operation of the tool 30 of the invention, with the steel cap 20 removed the head 40 of the tool 30 is lowered into the excavation, the tee adapter 54 is generally aligned with the free end 10b of the service tee and the frustoconical entrance 58 helps to locate the service tee 10 and guide the head 40 so that the opening 56 comes into alignment with the tee body 12. The operator rotates the entire tool 30 in a clockwise direction (or as appropriate for the threading on any particular service tee 10) to engage the free end 10*b* of the service tee 10 to the opening 56 in the tee adapter 54, thus sealing the head 40 to the service tee 10. The operator attaches pneumatic hoses 38 from connections provided at a conventional control panel (not shown) provided with shut-off valves and reversing switches for the pneumatic motors 64, 88 and actuator 94, and starts the air compressor (not shown).

The operator actuates the motor 64 to pivot the adapter plate 60 to the first working position, with the opening 66 and perforator adapter 110 aligned with the tee body 12, actuates the driver bit motor 88 in the counterclockwise direction and actuates the linear actuator 94 to extend the driver bit 90 through the adapter 110 and toward the perforator 14 until the hexagonal tip 90*b* contacts the top of the perforator 14. When the tip 90*b* is aligned with the socket 15 in the perforator 14 it engages the perforator 14. The operator determines this by the increase in resistance on the driver bit 90, and releases the actuator 94 so that the counterclockwise rotary motion drives the threaded perforator 14 out of the body 12 of the service tee 10.

As the perforator 14 is extracted from the tee body 12 the threaded exterior 14*a* of the perforator engages the threaded portion 117 of the bore 116 in the perforator adapter 110 and the continued rotation of the driver bit 90 threads the perforator 14 into the perforator holder 120. As a further means of avoiding misalignment problems, in the preferred embodiment the distance of the perforator adapter 110 from the free end 10*b* of the service tee 10 is such that the perforator 14 engages the perforator adapter 110 just as it disengages from the tee body 12. When the threaded portion 14*a* of the perforator 14 has fully receded into the enlarged section 115 of the bore 116, the driver bit 90 spins freely. The operator allows a preset time for this step, based on the number of revolutions required to engage the perforator 14 within the enlarged section 115 of the bore 116 and the rotational speed of the motor 88, and then stops the driver bit motor 88 and actuates the actuator 94 in reverse to disengage the hexagonal tip 90*b* from the socket 15 and fully retract the driver bit 90 into the tool 30.

The operator disengages the motor 64 and the adapter plate 60 returns to the second (central) working position (as shown in FIG. 2), with the opening 68 and milling bit adapter 150 in alignment with the opening 56 in the working face 44 of the housing 40. The operator actuates the driver bit motor 88 in the clockwise direction (or as suitable for the milling bit 140 used) and activates the linear actuator 94. As the driver bit 90 extends toward and contacts the milling bit 140 the hexagonal tip 90*b* engages the socket 144 and simultaneously rotates the milling bit 140 while driving it through the tee adapter 54 and the tee body 12 into the hole 3 cut by the perforator 14 in the main 2 when the service tee 10 was installed.

The milling bit 140 cuts a smooth seat in the wall of the main 2 about the hole 3 until the stop surface 148 contacts the wall of the main 2. After a selected time interval sufficient to complete the milling step of the procedure, the operator stops the driver bit motor 88 and actuate the actuator 94 in reverse to retract the driver bit 90 fully into the tool 30. The milling bit 140 is retained on the driver bit 90 by the ball 90*a* until the milling bit 140 has been retracted fully into the bore 154, at which point the driver bit 90 dislodges from the milling bit 140.

The operator actuates the motor 64 to pivot the adapter plate 60 to the third working position, with the opening 70 and sealing plug adapter 170 in alignment with the opening 56 in the working face 44 of the housing 40. The operator actuates the driver bit motor 88 clockwise and the linear actuator 94 in the forward direction, and as the driver bit 90 extends toward and contacts the sealing plug 180 the hexagonal tip 90*b* engages the socket 190 and drives the sealing plug 180 out of the sealing plug adapter 170 and into the tee body 12. As the sealing plug 180 reaches the main 2 the tip 184 of the plug 180 is driven into the hole 3 in the main and the gasket 188 is compressed between the sealing plug 180 and the seat cut by the milling bit 140. When the stop surface 185 contacts the wall of the main the driver bit 90 stops rotating, signalling the operator to deactivate the driver motor 88 and retract the driver bit 90 back into the tool 30.

In the preferred embodiment the head 40 of the tool 30 is provided with a pressure relief opening 41 coupled to a pressure gauge and relief valve on the control panel (not shown). Once the sealing operation is completed as described above, the operator opens the relief valve to relieve the gas pressure within the head 40. Leaving the head 40 engaged to the service tee 10, the operator can test the seal by closing the relief valve and monitoring the pressure gauge to see if the pressure within the head 40 begins to rise. If the pressure in the head 40 remains stable, then the sealing procedure was successful.

The service tee 10 can be cut off below the service outlet 16 by any suitable cutting tool, for example a rotary pneumatic saw (not shown) on an extension handle, which may have gripping means for gripping the service tee 10 to stabilize the saw during the cutting procedure and a manually or mechanically operated blade actuator for driving the saw blade through the tee body 12. The cut portion of the service tee 10 is removed, and the pin-off may be covered by mastic to resist corrosion. The excavation is backfilled and any surface structure replaced or repaired to complete the pin-off procedure. The particular means and manner of cutting the service tee 10 and backfilling the excavation is a matter of selection out of a number of conventional alternatives and does not form part of the present invention.

A preferred embodiment of the invention having been thus described by way of example only, it will be apparent to those skilled in the art that certain modifications and adaptations may be made without departing from the scope of the invention, as set out in the appended claims.

We claim:

1. A tool for plugging a service connection in a gas main comprising a service tee having a connector body affixed to and in fluid communication with the pipe through a hole in a wall of the pipe, the connector body having an interior threaded surface and a threaded body with an engagable socket engaged in the connector body, comprising a head having a working face with an opening for engagement to the free end of the connector body, a retractable driver bit having a tip adapted to engage the socket in the threaded body, in generally concentric alignment with the opening, a first actuator for extending the driver bit through the opening in the working face, a second actuator for rotating the driver bit, an adapter plate mounted within the head and pivotable between first, second and third working positions, the adapter plate having a first opening in generally concentric alignment with the opening in the working face when the adapter plate is in the first working position, a second opening in generally concentric alignment with the opening in the working face when the adapter plate is in the second working position, and a third opening in generally concentric alignment with the opening in the working face when the adapter plate is in the third working position, a holder for engaging the threaded body, mounted on the adapter plate in the first working position, a milling bit for milling a seat in the wall of the pipe, mounted on the adapter plate in the second working position, and a sealing plug for threadedly engaging the connector body mounted on the adapter plate in the third working position, wherein the driver bit engages the threaded body to extract the threaded body from the connector body in the first working position; the driver bit engages the milling bit to drive the milling bit into the connector body to mill a seat in the wall of the pipe in the second working position; and the driver bit engages the sealing plug to drive the sealing plug into the connector body and plug the hole in the third working position.

2. A tool for plugging a connection in a pipe wherein the connection comprises a connecting member having a connector body affixed to and in fluid communication with the pipe through a hole in a wall of the pipe, the connector body having an interior threaded surface and a threaded body with an engagable socket engaged in the connector body, comprising a head having a working face with an opening for engagement to the free end of the connector body, a retractable driver bit having a tip adapted to engage the socket in the threaded body, in generally concentric alignment with the opening, a first actuator for extending the driver bit through the opening in the working face, a second actuator for rotating the driver bit, an adapter plate mounted within the head and pivotable between first, second and third working positions, the adapter plate having a first opening in generally concentric alignment with the opening in the working face when the adapter plate is in the first working position, a second opening in generally concentric alignment with the opening in the working face when the adapter plate is in the second working position, and a third opening in generally concentric alignment with the opening in the working face when the adapter plate is in the third working position, a holder for engaging the threaded body, mounted on the adapter plate in the first working position, a milling bit for milling a seat in the wall of the pipe, mounted on the adapter plate in the second working position, and a sealing plug for threadedly engaging the connector body mounted on the adapter plate in the third working position, wherein the driver bit engages the threaded body to extract the threaded body from the connector body in the first working position; the driver bit engages the milling bit to drive the milling bit into the connector body to mill a seat in the wall of the pipe in the second working position; and the driver bit engages the sealing plug to drive the sealing plug into the connector body and plug the hole in the third working position.

3. The tool of claim 2 wherein the connecting member is a service tee and the pipe is a steel gas main, the connector body being affixed to the main at generally a right angle.

4. A method of plugging a connection in a pipe wherein the connection comprises a connecting member having a connector body affixed to and in fluid communication with the pipe through a hole in a wall of the pipe, the connector body having an interior threaded surface and a threaded body with an engagable socket engaged in a free end of the connector body, comprising the steps of:

a) providing a tool with a head having a working face comprising an opening for engagement to the free end of the connecting body, a retractable driver bit having a tip adapted to engage the socket in the threaded body in generally concentric alignment with the opening, a first actuator for extending the driver bit through the opening in the head and a second actuator for rotating the driver bit;

b) aligning a holder for engaging the threaded body with the opening in the working face, extending the driver bit into the socket and rotating the driver bit to remove the threaded body from the connector body;

c) aligning a milling bit with the opening in the working face, extending the driver bit into a socket of the milling bit and rotating and extending the driver bit to mill a seat in the wall of the pipe; and d) aligning a sealing plug with the opening in the working face, extending the driver bit into a socket in the sealing plug and rotating the driver bit to drive the sealing plug into the connector body to plug the hole.

* * * * *